(12) United States Patent
Chen et al.

(10) Patent No.: US 6,869,544 B2
(45) Date of Patent: Mar. 22, 2005

(54) PROCESS FOR PRODUCING NANOSCALE YTTRIUM ALUMINUM GARNET (YAG) FLUORESCENT POWDERS

(75) Inventors: In-Gann Chen, Tainan (TW); Yu-Lin Chen, Tainan (TW); Chii-Shyang Hwang, Tainan (TW)

(73) Assignee: National Cheng Kung University, Tainan (TW)

( * ) Notice: Subject to any disclaimer, the term of this patent is extended or adjusted under 35 U.S.C. 154(b) by 0 days.

(21) Appl. No.: 10/285,095

(22) Filed: Oct. 31, 2002

(65) Prior Publication Data

US 2003/0111644 A1 Jun. 19, 2003

(30) Foreign Application Priority Data

Dec. 14, 2001  (TW) ........................................ 90131074 A

(51) Int. Cl.$^7$ ............................................. C09K 11/80
(52) U.S. Cl. ............................................. 252/301.4 R
(58) Field of Search .................... 117/945; 252/301.4 R

(56) References Cited

FOREIGN PATENT DOCUMENTS

RU             412585         11/2000

OTHER PUBLICATIONS

Manabu Gomi & Tomohiko Kanie; $Ce^{3+}$, $Fe^{3+}$ Induced Optical Absorption in Ce, Fe: YAG Prepared by Coprecipitation; Jpn. J. Appl. Phys. vol. 35 (1996) pp. 1798–1801.

Chen, Yu Lin Synthesis and Characterization of Garnet (Y3A 15012) Phosphors Published Abstract (2001) pp. 1–6.
Nae–Lih Wu, Sze–Yen Wang. I.A. Rusakova "Inhibition of Crystallite Growth in the Sol–Gel Synthesis of Nanocrystalline Metal Oxides" Science vol. 285 Aug. 27, 1999 pp. 1375–1377.

*Primary Examiner*—C. Melissa Koslow
(74) *Attorney, Agent, or Firm*—Ladas & Parry

(57) ABSTRACT

The present invention pertains to a process for synthesizing nano-scale yttrium aluminum garnet (YAG) fluorescent powders having formula (I):

$$(Y_{3-x}R^1_x)(Al_{5-y}R^2_y)O_{12} \qquad (I)$$

wherein $R^1$ and $R^2$ are independently selected from the elements consisting of rare earth metals and transition metals, and each of x and y is independently a value between 0 and 1.5, where the process comprises the steps:

(a) forming an aqueous solution comprising rare earth metal ions, transition metal ions, yttrium ion and aluminum ion;

(b) adding a precipitating agent to the aqueous solution of step (a) in an amount sufficient to allow the rare earth metal ions, transition metal ions, yttrium ion and aluminum ion comprised in the aqueous solution to substantially complex with the depositing agent;

(c) drying the gel of step (b) to obtain a dried gel;

(d) adding a dehydroxying compound to the dried gel of step (c) and subjecting it to a further drying step; and (e) sintering the product of step (d) at a temperature between 700 and 1400° C. to obtain the nano-scale yttrium aluminum garnet fluorescent powders of formula (I).

13 Claims, 9 Drawing Sheets

| elements | weight% | atom% | |
|---|---|---|---|
| Y-L | 34.45 | 9.64 | 3 |
| Al-L | 17.23 | 15.89 | 4.94 |
| O-K | 48.32 | 74.47 | |

PROCESS FOR PRODUCING NANOSCALE YTTRIUM ALUMINUM GARNET (YAG) FLUORESCENT POWDERS

FIELD OF THE INVENTION

The present invention pertains to the field of nano-scale fluorescent powders. Particularly, the present invention provides a process for preparing nano-scale yttrium aluminum garnet (YAG) fluorescent powders.

BACKGROUND OF THE INVENTION

Fluorescent powders are widely utilized in various fluorescent articles in our daily life, such as television cathode ray tube, display cathode ray tube, monitoring cathode ray tube, radar, flying-spot scanner, image-sensitivity enhancing device, cathode ray tube for copy machines, vacuum fluorescent display tube, electric plasma display, illuminating equipments, traffic signs, fluorescent plates, sensitivity-enhancing papers, and light-emitting diodes. Recently, due to the enhanced requirements of customers to image quality, such as resolution and lightness, and to illuminating effect, the researches on fluorescent powder are gradually noticed.

One importantly known fluorescent powder is yttrium aluminum garnet fluorescent powder having the chemical formula $Y_3Al_5O_{12}$ (hereafter referred to as "YAG"). YAG is a compound consisting of $Y_2O_3$ and $Al_2O_3$ in the ratio of 3:5. Due to having specific laser optical properties, the compound is widely utilized in laser materials and fluorescent materials. YAG is a material having extremely high thermal stability. Because of wide bandgap energy, this material per se can emit ultra violet light (i.e. the short wavelength area). After being doped with rare earth metal elements, the emitting wavelength is then shifted to visible area (i.e. the long wavelength area). For illustration, YAG doped with cerium can emit yellow light, YAG doped with terbium can emit green light, and YAG doped with europium can emit red light.

YAG can be made by many conventional processes, such as solid state reaction process. The powders obtained by this process have a lager particle size, normally within the range between about 1 $\mu$m to tens of $\mu$m. Co-precipitating method and sol-gel method are commonly utilized in the art. The principle of co-precipitating method lies in adding a suitable precipitating agent, such as oxalic acid, citric acid, and carbonates, to allow the metal ions comprised in the aqueous solution containing metal ions such as cerium, yttrium, and aluminum ions to form complexes that are difficult to dissolve in water, at the same precipitating rate. Uniform fluorescent powder having small particle size can be obtained after filtration, heat-treatment and sintering at elevated temperature. A prior art technique pertaining to co-precipitation method can be seen in, for example, the article entitled "$Ce^{3+}$, $Fe^{3+}$-induced Optical Absorption in Ce,Fe:YAG Prepared by Co-precipitation," (Jpn. J. Appl. Phys. Vol. 35. (1996) p.p. 1798–1801, Manabu et. al.). The principle of sol-gel method lies in mixing di-carboxylic acids and metal salts in polyol solutions to form metal alkoxides. After hydrolysis and thermal decomposition, fluorescent powder is obtained. A prior art technique pertaining to sol-gel method can be seen in, for example, the article entitled "Preparation and Characterization of Fine-Grain Yttrium-Based Phosphors by Sol-Gel Process," J. Electrochem. Soc., Vol: 143, No. 1, January 1996, Ravi P. Rao).

However, fluorescent powders prepared by co-precipitation method normally comprise amorphous materials that contain large amount of hydroxy groups (—OH). During heat treatment, crystals will overly grow, which causes overly large particle size. When the resulting powders are applied to coating, unsatisfied uniformity and density result, which subsequently influences the fluorescent effect and resolution. Fluorescent powders prepared by sol-gel methods also have the disadvantage of the particle size being overly large.

Therefore, it becomes an important issue of the art to reduce the particle size of YAG fluorescent powders. Persons skilled in the art are working on producing the microparticles of YAG fluorescent powders. ROC (Taiwan) Patent Publication No. 412585 discloses a process for preparing fine particles of YAG fluorescent powders doped with cerium. The process is carried out by adding a chelating agent having both COOH ion and OH ion into an aqueous solution containing cerium, yttrium, and aluminum ions. After thermally treating the resulting viscous gel and removing the water contained in the gel, the gel is then subjected to sintering at a temperature between 1000 to 1500° C. However, the sintering temperature required in this known technique is still too high. This is disadvantageous to energy reduction, and causes increased production cost.

There is a need for a process that is simple and suitable for producing nano-scale YAG fluorescent powders in large scale.

SUMMARY OF THE INVENTION

The present invention pertains to a process for producing nano-scale yttrium aluminum garnet (YAG) fluorescent powders, which essentially utilizes the addition of a dehydroxying compound to remove the hydroxy groups of the water-containing precipitating material prepared by co-precipitation. The treated gel, after being sintered, can produce fluorescent powders having fine particle size.

DETAILED DESCRIPTION OF INVENTION

Figure 1:
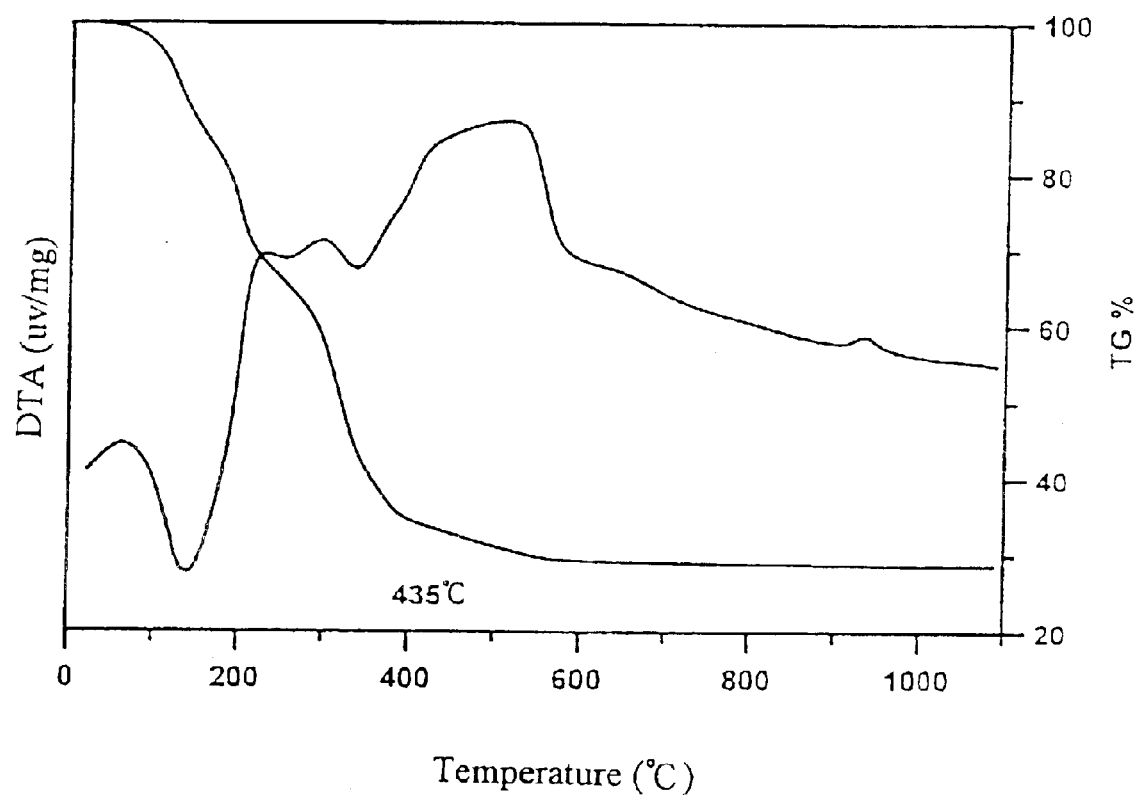
FIG. 1 shows the thermal gravimetry analysis and thermal differential analysis diagram of the gel of the present invention after being dried at 90° C.

The object of the present invention is to provide a process that is simple and suitable for producing nano-scale yttrium aluminum garnet fluorescent powders in large scale.

Particularly, the present invention pertains to a process for synthesizing nano-scale yttrium aluminum garnet (YAG) fluorescent powders having formula (I):

$$(Y_{3-x}R^1_x)(Al_{5-y}R^2_y)O_{12} \quad (I)$$

wherein $R^1$ and $R^2$ are independently selected from the elements consisting of rare earth metals and transition metals, and each of x and y is independently a value between 0 and 1.5, where the process comprises the steps of:
 (a) forming an aqueous solution comprising rare earth metal ions, transition metal ions, yttrium ion and aluminum ion;
 (b) adding as precipitating agent to the aqueous solution of step (a) in an amount sufficient to allow the rare earth metal ions, transition metal ions, yttrium ion and aluminum ion comprised in the aqueous solution to substantially complex with the precipitating agent:
 (c) drying the gel of step (b) to obtain a dried gel;
 (d) adding a dehydroxying compound to the dried gel of step (c) and subjecting it to a further drying step; and
 (e) sintering the product of step (d) at a temperature between 700 and 1400° C. to obtain the nano-scale yttrium aluminum garnet fluorescent powders of formula (I).

Preferably, in the above formula (I), $R^1$ and $R^2$ are independently selected from the group consisting of cerium, samarium, gadolinium, cadmium, chromium, and gallium, and each of x and y is independently a value between 0 and 1.0. In a preferred embodiment of the present invention, $R^1$ is cerium and y is 0.

Generally, the definitions of so-called "nano-scale particles" are different in different technical fields. For example, in powder metallurgy field, it refers to the largest particle size of the powders that is below 10 μm. In the field of inorganic compounds, it normally refers to the particles that have a particle size of less than 0.1 μm, or even less than 1 μm. In the field of ceramic powders, such as the present invention, it normally refers to the particles that have a particle size between 1 nm to 100 nm.

The aqueous solution comprising rare earth metal ions, transition metal ions, yttrium ion and aluminum ions of step (a) of the present invention may be prepared by any known techniques. Preferably, it is prepared by dissolving the salts (such as nitrates) of rare earth metal ions, transition metal ions, yttrium ion and aluminum ion in water.

The precipitating agents suitable for use in step (b) are known. Preferably, the precipitating agents are selected from the group consisting of triethylamine, oxalic acid, citric acid and carbonates. More preferably, the precipitating agent is triethylamine or oxalic acid.

The drying temperature of step (c) can be properly adjusted by persons skilled in the art. Preferably, it is within the range between 80 and 110° C.

The dehydroxying compound of step (d) can be any compounds that comprise silanyl groups. Hexamethyldisilazane $((CH_3)_3SiNHSi(CH_3)_3)$ (i.e. HMDS) is preferred.

When utilizing HMDS, it undergoes the following reaction:

$$2\text{—OH} + [Si(CH_3)_3]_2NH_2 \rightarrow 2\text{—OSi}(CH_3)_3 + NH_3$$

This compound is effective in removing hydroxy groups. Moreover, since the inert siloxanyl is formed after the above reaction, the crystals will not be attracted to each other during sintering. Thus, the over growth of crystals is improved.

The dried gel of step (c) is subjected to another drying step in step (d). The drying temperature can be properly adjusted by persons skilled in the art. Preferably, it is within the range between 100 and 200° C.

The dried gel obtained in step (d) is subjected to sintering in step (e), so as to obtain the nano-scale fluorescent powders of the present invention. The sintering is conducted at a temperature between 700 and 1400° C., preferably between 900 and 1000° C., and most preferable between 950 and 1000° C.

The yttrium aluminum garnet fluorescent powders produced by the present invention possess a nano-scale particle size. Preferably, the yttrium aluminum garnet fluorescent powders have a particle size of 20 to 100 nm, preferably 20 to 40 nm.

Figure 9:
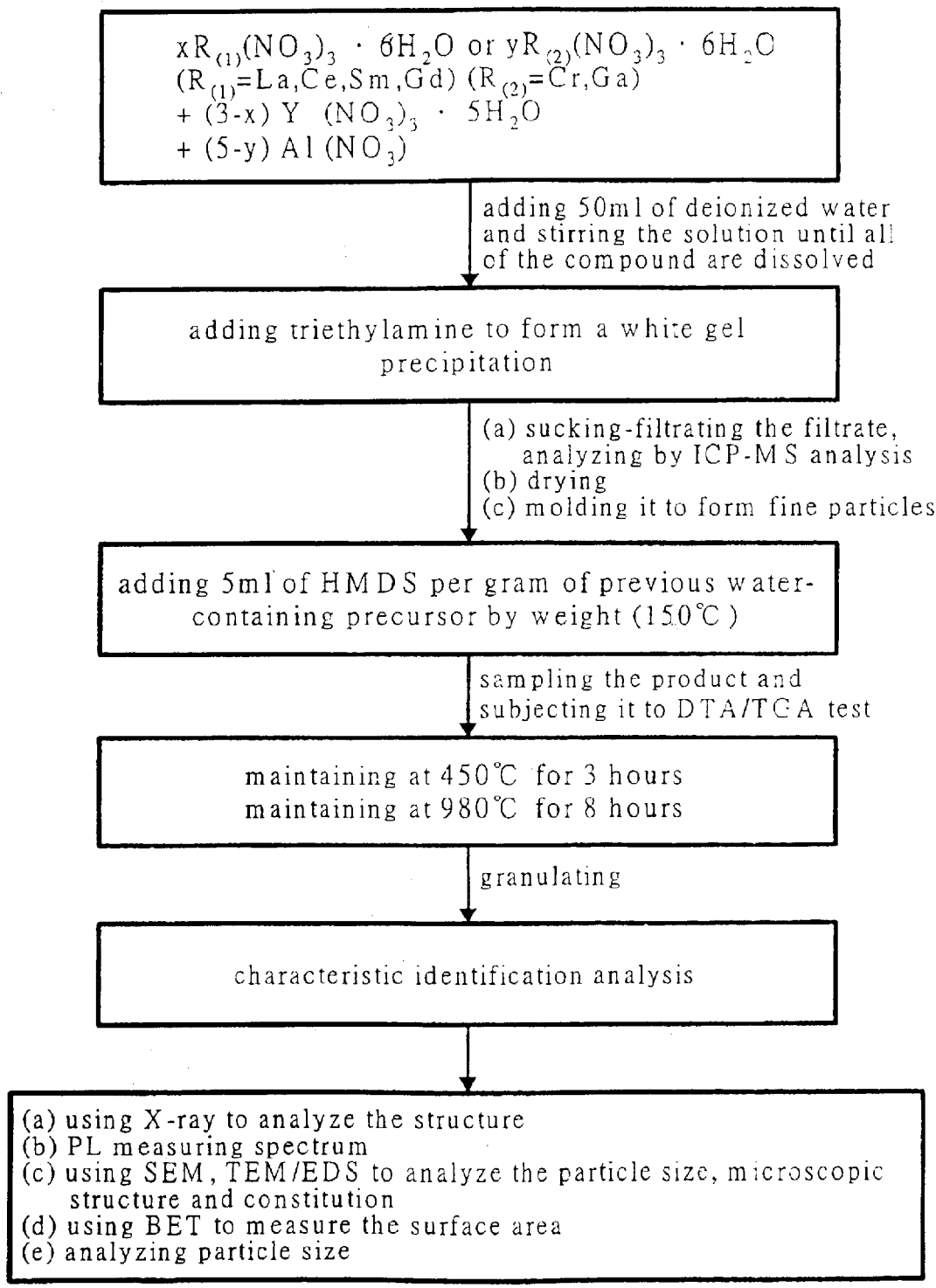
FIG. 9 is a flow chart which provides a schematic representation of a preferred sequence of operations according to the invention.

A preferred embodiment of the present invention is shown in FIG. 9.

Flow-chart I

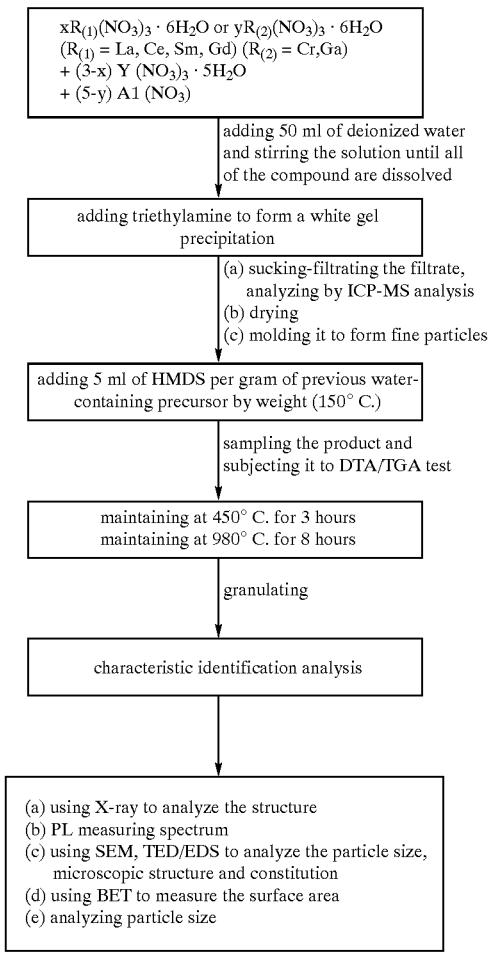

The objects, characteristics and advantages of the present invention can be more understood by a study of the example below.

EXAMPLE 1

Preparation of $(Y_{2.99}Ce_{0.01})Al_5O_{12}$ 5.746 g (0.015 mole) of yttrium nitrate, 10.9 g (0.25084 mole) of aluminum nitrate and 0.022 g (0.0005 mole) of cerium nitrate are added into 50 ml of de-ionized water at ambient temperature. The solution is well stirred until all the compounds are fully dissolved. During stirring, 17 ml of triethylamine is added into the aqueous solution. At this time, the pH value of the solution is between 9 and 9.5. After being stirred for 3 to 10 minutes, white gel precipitation is formed. After sucking filtration, a white gel is obtained. The white gel is dried at 90° C. to remove water, so as to obtain a dried gel. The thermal gravimetry analysis and thermal differential analysis diagram of the gel of the present invention is shown in FIG. 1.

HMDS is added into the gel at a ratio of 5 ml hexamethyldisilazane (HMDS) per gram of the water-containing precursor. The mixture is then dried at 150° C. for 1 hour. After that, the product is pre-heated at 450° C. for 3 hours and sintered at 980° C. for 8 hours. 1.601 g (0.0027 mole) of nano-scale cerium doped yttrium aluminum garnet fluorescent powders are obtained.

Figure 2:
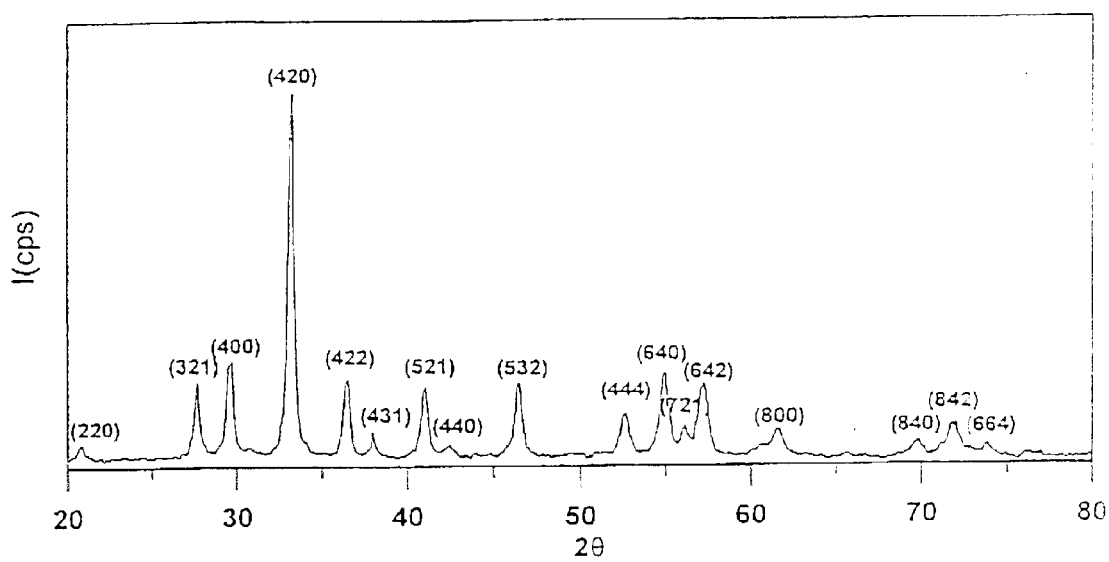
FIG. 2 shows the X-ray diffraction spectrum of the powders of the present invention obtained after being sintered at 980° C.
Figure 3:
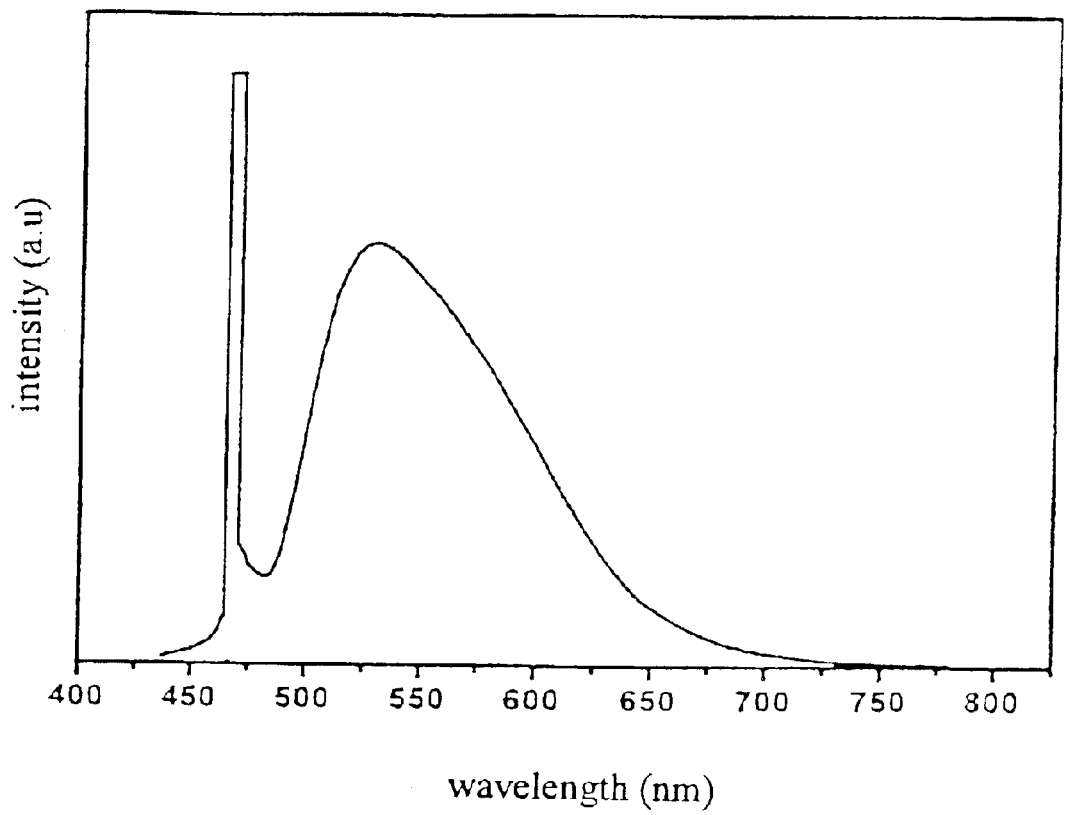
FIG. 3 shows the emission spectrum of the powders described in FIG. 2 excited by blue light having a wavelength of 457 nm.
Figure 4:
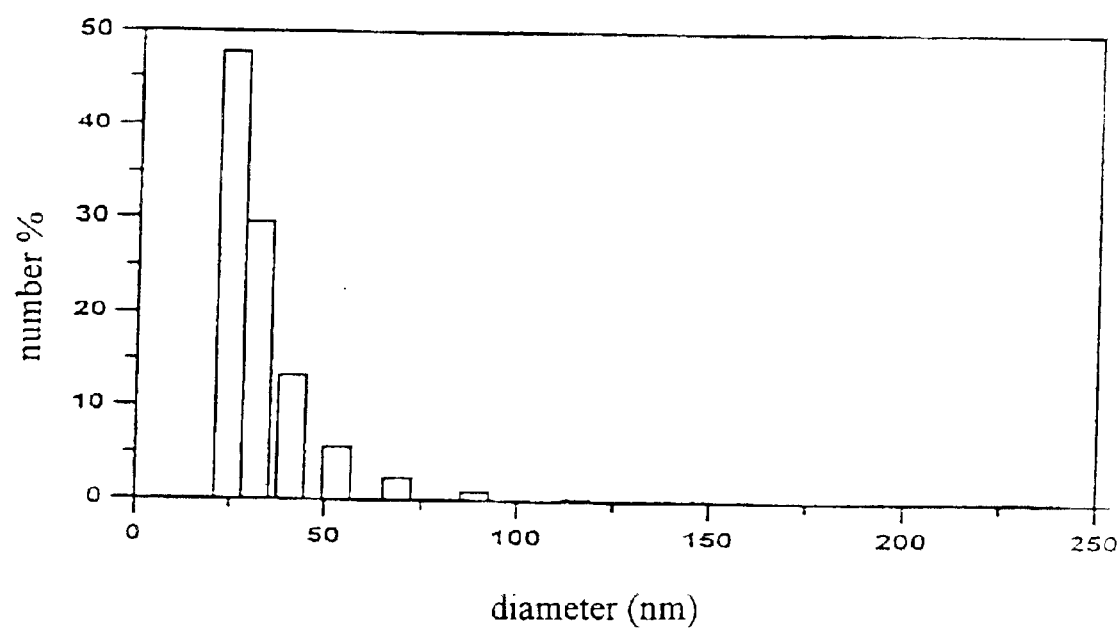
FIG. 4 shows the particle size distribution of the powders of the present invention.
Figure 5:
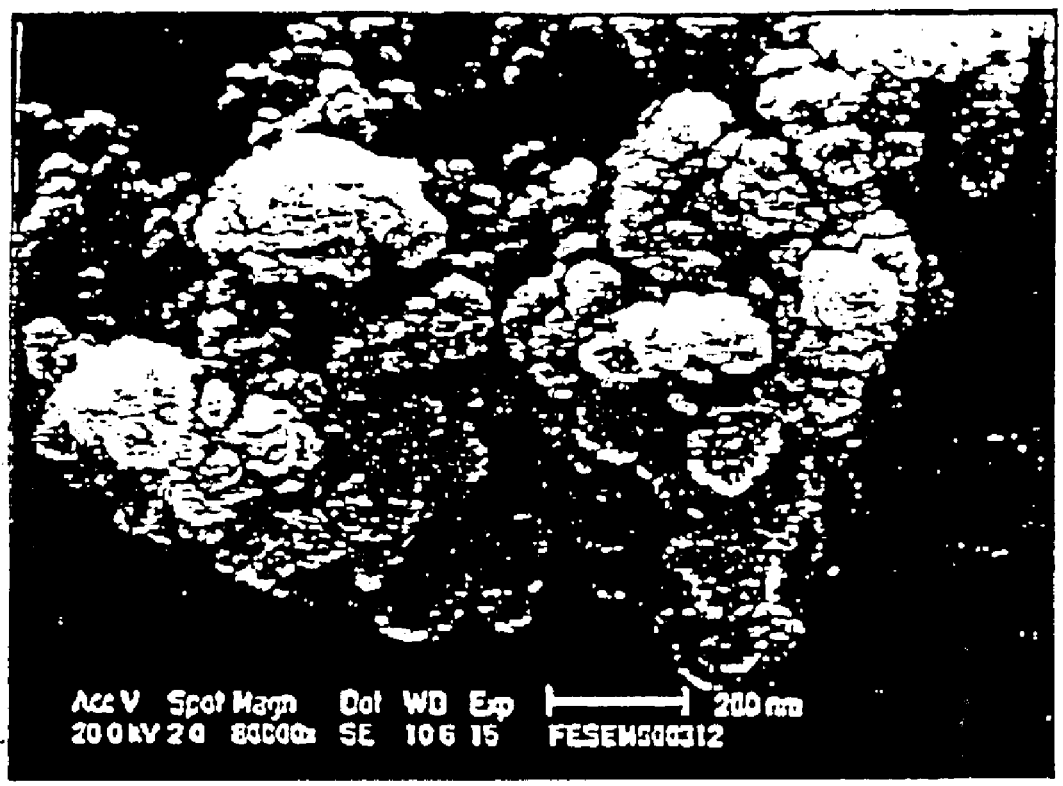
FIG. 5 shows the micrograph of the powders of the present invention obtained by using a scanning electron microscope.
Figure 6:
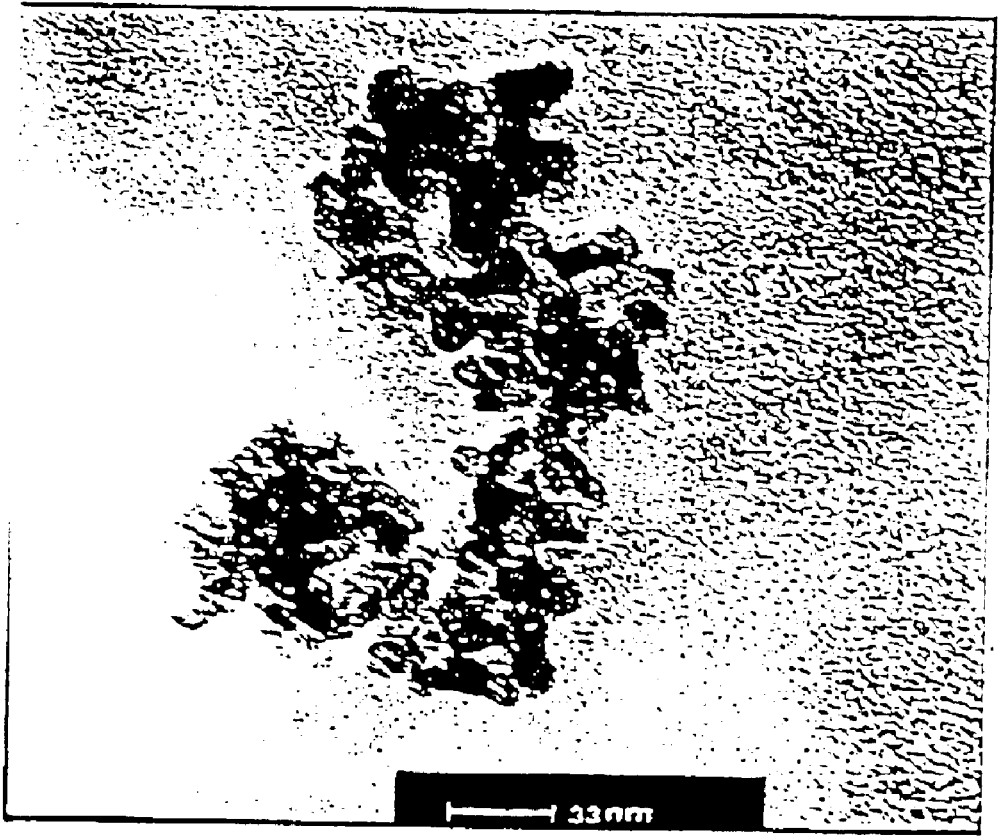
FIG. 6 shows the micrograph of the powders of the present invention obtained by using a transmission electron microscope.
Figure 7:
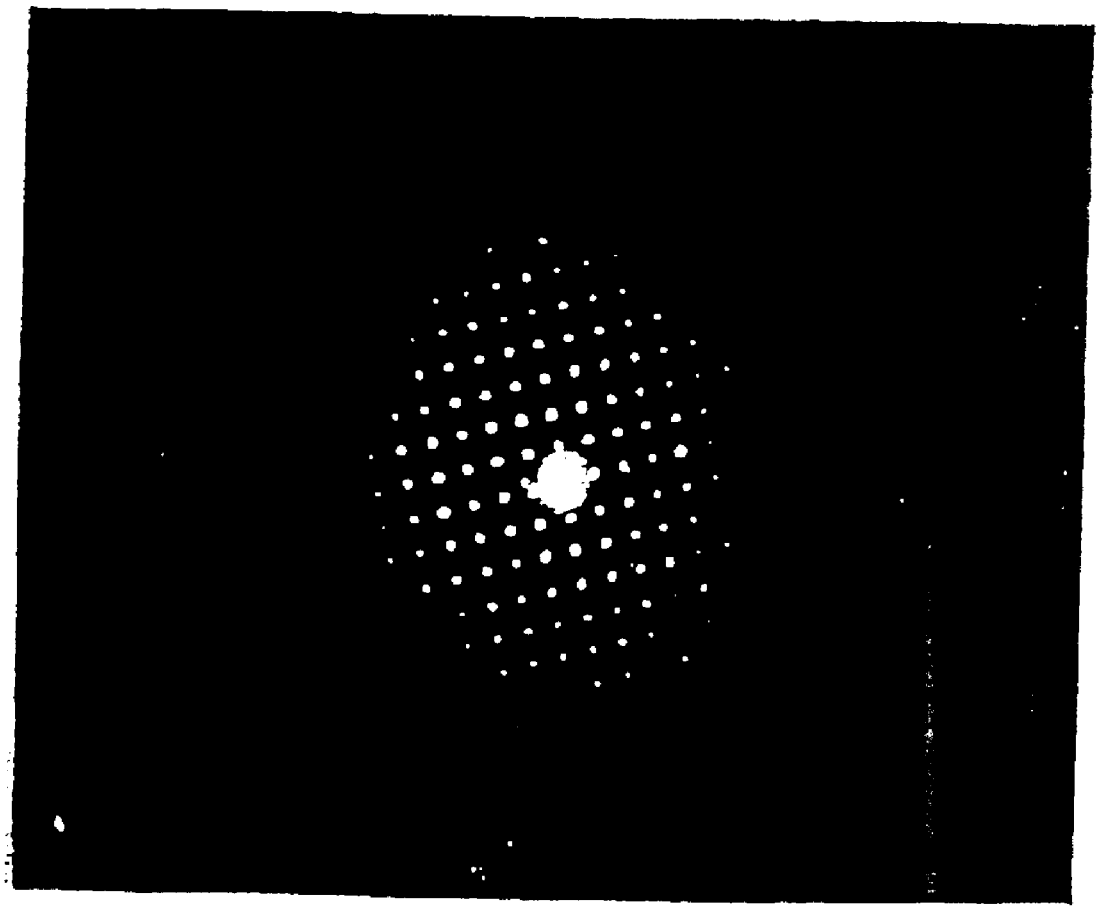
FIG. 7 shows the electron diffraction pattern of the powders of the present invention obtained by using a transmission electron microscope.
Figure 8:
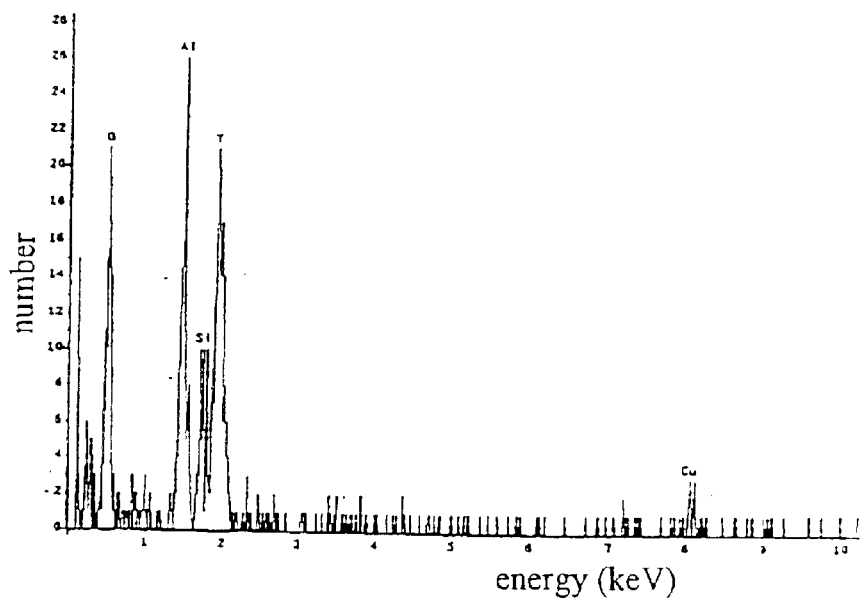
FIG. 8 shows the quantitative analysis of the powders of the present invention obtained by using energy dispersion X-ray spectrometer (EDS).

X-ray is utilized to analyze the structure of the powders of the present invention. The result is shown in FIG. 2. The blue light having a wavelength of 457 nm is used to excite the powders of the present invention. The result is shown in FIG. 3. Scanning electron microscope (SEM), transmission electron microscope (TEM) and energy dispersion X-ray spectrometer (EDS) are used to analyze the particle size, microscopic structure and constitution of the powders of the present invention. The results are shown in FIGS. 4 to 8.

What is claimed is:

1. A process for synthesizing nano-scale yttrium aluminum garnet (YAG) fluorescent powders having formula (I):

wherein $R^1$ and $R^2$ are independently selected from the elements consisting of rare earth metals and transition metals, and each of x and y is independently a value between 0 and 1.5, where the process comprises the steps:

(a) forming an aqueous solution comprising rare earth metal ions, transition metal ions, yttrium ion and aluminum ions;

(b) adding a precipitating agent to the aqueous solution of step (a) in an amount sufficient to allow the rare earth metal ions, transition metal ions, yttrium ion and aluminum ions in the aqueous solution to substantially complex with the precipitating agent;

(c) drying the gel of step (b) to obtain a dried gel;

(d) adding a dehydroxying compound to the dried gel of step (c) and subjecting it to a further drying step; and (e) sintering the product of step (d) at a temperature between 700 and 1400° C. to obtain the nano-scale yttrium aluminum garnet fluorescent powders of formula (I).

2. The process according to claim 1, wherein $R_1$ and $R^2$ are independently selected from the group consisting of cerium, samarium, gadolinium, cadmium, chromium, and gallium, and each of x and y is independently a value between 0 and 1.0.

3. The process according to claim 1, wherein $R^1$ is cerium and y is 0.

4. The process according to claim 1, wherein an aqueous solution comprising rare earth metal ions, transition metal ions, yttrium ion and aluminum ions of step (a) is prepared by dissolving the nitrates of rare earth metal ions, transition metal ions, yttrium ion and aluminum ions in water.

5. The process according to claim 1, wherein the precipitating agent in step (b) is selected from the group consisting of triethylamine, oxalic acid, citric acid and carbonates.

6. The process according to claim 1, wherein step (c) is conducted at a temperature between 80 and 110° C.

7. The process according to claim 1, wherein the dehydroxying compound of step (d) is selected from compounds comprising silanyl groups.

8. The process according to claim 7, wherein the dehydroxying compound is hexamethyldisilazane.

9. The process according to claim 1, wherein the drying of the gel in step (d) is conducted at a temperature between 100 and 200° C.

10. The process according to claim 1, wherein the sintering in step (e) is conducted at a temperature between 900 and 1000° C.

11. The process according to claim 10, wherein the sintering in step (e) is conducted at a temperature between 950 and 1000° C.

12. The process according to claim 1, wherein the nano-scale yttrium aluminum garnet fluorescent powders have a particle size of 20 to 100 nm.

13. The process according to claim 12, wherein the nano-scale yttrium aluminum garnet fluorescent powders have a particle size of 20 to 40 nm.

* * * * *